US012674947B2

(12) United States Patent
Johansson et al.

(10) Patent No.:  US 12,674,947 B2
(45) Date of Patent:      Jul. 7, 2026

(54) FIBER-OPTIC CABLE WITH MONITORING OF BACKWARD-PROPAGATING RADIATION

(71) Applicant: Optoskand AB, Mölndal (SE)

(72) Inventors: Fredrik Johansson, Gothenburg (SE); Christian Rydberg, Gråbo (SE); Olof Sallhammar, Nödinge (SE); Mats Blomqvist, Sävedalen (SE)

(73) Assignee: Optoskand AB, Mölndal (SE)

( * ) Notice: Subject to any disclaimer, the term of this patent is extended or adjusted under 35 U.S.C. 154(b) by 368 days.

(21) Appl. No.: 18/414,763

(22) Filed: Jan. 17, 2024

(65) Prior Publication Data

US 2024/0248267 A1      Jul. 25, 2024

Related U.S. Application Data

(60) Provisional application No. 63/440,975, filed on Jan. 25, 2023.

(51) Int. Cl.
G02B 6/42          (2006.01)
G02B 6/26          (2006.01)
(52) U.S. Cl.
CPC ........... G02B 6/4286 (2013.01); G02B 6/262 (2013.01); G02B 6/4296 (2013.01)
(58) Field of Classification Search
CPC ..... G02B 6/262; G02B 6/4286; G02B 6/4296
USPC .................................... 385/12, 31, 47; 372/6
See application file for complete search history.

(56) References Cited

U.S. PATENT DOCUMENTS

| | | | |
|---|---|---|---|
| 5,146,521 | A | 9/1992 | Hartog |
| 5,319,195 | A | 6/1994 | Jones et al. |
| 6,347,178 | B1 | 2/2002 | Edwards et al. |
| 8,988,669 | B2 | 3/2015 | Liao |

(Continued)

FOREIGN PATENT DOCUMENTS

| | | | |
|---|---|---|---|
| EP | 2265407 B1 | 5/2012 | |
| JP | 63-249118 | * 10/1988 | ............... G02B 6/28 |

OTHER PUBLICATIONS

International Search Report and Written Opinion received for International Patent Application No. PCT/EP2024/051027 mailed on Apr. 25, 2024, 13 pages.

(Continued)

*Primary Examiner* — Robert Tavlykaev
(74) *Attorney, Agent, or Firm* — TraskBritt

(57)          ABSTRACT
A fiber-optic cable includes an optical fiber that transports a forward-propagating laser beam. The optical fiber includes a core, a cladding, and an output end-face emitting the forward-propagating beam. The fiber-optic cable also includes a mode-stripper, along a segment of the optical fiber, that couples out backward-propagating radiation that has been coupled into the cladding at the output end-face. The fiber-optic cable further includes a waveguide having a waveguide body with a bore containing at least part of the segment of the optical fiber. The bore is defined by an inward-facing surface that guides at least a fraction of the backward-propagating radiation, coupled out of the cladding by the mode-stripper, toward a rear opening of the bore farthest from the output end-face. Additionally, the fiber-optic cable includes one or more sensors or fiber ports that receive portions of the backward-propagating radiation emerging from the rear opening.

19 Claims, 5 Drawing Sheets

(56) References Cited

U.S. PATENT DOCUMENTS

| | | | |
|---|---|---|---|
| 9,134,171 B2 | 9/2015 | Blomster et al. | |
| 9,547,121 B2 * | 1/2017 | Hou | H01S 3/0941 |
| 10,082,630 B1 * | 9/2018 | Hsia | G02B 6/14 |
| 10,901,162 B2 | 1/2021 | Kliner | |
| 2004/0101248 A1 | 5/2004 | Tavlykaev et al. | |
| 2008/0129985 A1 | 6/2008 | Laffont et al. | |
| 2009/0154512 A1 | 6/2009 | Simons et al. | |
| 2011/0140011 A1 | 6/2011 | Uchida | |
| 2012/0008648 A1 | 1/2012 | Gapontsev et al. | |
| 2017/0017036 A1 | 1/2017 | Botheroyd | |
| 2017/0329085 A1 * | 11/2017 | Kliner | G02B 6/036 |
| 2020/0292383 A1 | 9/2020 | Sakamoto | |
| 2023/0349754 A1 | 11/2023 | Karlsen et al. | |
| 2024/0184049 A1 * | 6/2024 | Reeves-Hall | B33Y 10/00 |

OTHER PUBLICATIONS

Blomster et al., (2012). "High-power fiber optic cable with integrated active sensors for live process monitoring," SPIE Photonics West Conference in San Francisco, 12 pages.

* cited by examiner

FIBER-OPTIC CABLE WITH MONITORING OF BACKWARD-PROPAGATING RADIATION

CROSS-REFERENCE TO RELATED APPLICATIONS

This application claims the benefit of U.S. Provisional Application No. 63/440,975, filed Jan. 25, 2023, the entire contents of which is incorporated herein by reference.

TECHNICAL FIELD OF THE INVENTION

The present invention relates to laser processing of materials using laser light delivered by a fiber-optic cable. The present invention relates in particular to the integration of sensors in the fiber-optic cable for the purpose of monitoring the laser process.

DISCUSSION OF BACKGROUND ART

Beams of high-power laser radiation are used to machine, weld, and otherwise work a wide range of materials, including metals, plastics, and glass. Common industrial laser processes include cutting, scribing, drilling, marking, welding, heat treating, and annealing. A typical laser processing apparatus includes a laser source that generates a laser beam, and a processing head that focuses the laser beam onto a workpiece and steers the laser beam as needed. The processing head has several free-space optical elements for focusing and steering the laser beam. Frequently, however, the laser beam is transported from the laser source to the processing head via a fiber-optic cable.

Most industrial laser processes require high laser power. The average laser power may be as much as tens of kilowatts. Fiber-optic cables used to transport the laser beam therefore need to be able to handle high laser power. The connectors at the input and output ends of the fiber-optic cable can be subject to a substantial heat load from partial reflections (e.g., at the interface between the fiber end-face and an endcap), inadvertent light leakage from the optical fiber (for example caused by mechanical strain and stress), and deliberate mode-stripping to remove portions of the laser beam propagating in a cladding mode of the optical fiber. The connector at the output end of the fiber may also be subject to a heat load from laser radiation back-reflected from the workpiece. Some industrial fiber connectors are water-cooled to manage the heat load and may include sensors that monitor the condition of the fiber-optic cable.

Radiation propagating backwards from the workpiece through the processing head can provide useful information about the laser process. Such backward-propagating radiation includes back-reflected laser radiation, luminous radiation, and thermal radiation. The back-reflected laser radiation stems from specular reflection and other elastic scattering of the forward-propagating laser beam (the beam used to process the workpiece). The back-reflected laser radiation has the same wavelength as the forward-propagating laser beam. The luminous radiation stems from inelastic scattering of the forward-propagating laser beam and typically spans a much wider wavelength range than the forward-propagating laser beam. The thermal radiation is caused by the forward-propagating laser beam heating the target area of the workpiece. Many industrial laser processes heat the target area to several thousand Kelvin, such that the thermal radiation peaks in the near-infrared or even in the red portion of the visible spectrum.

SUMMARY OF THE INVENTION

Disclosed herein is a fiber-optic cable with functionality for monitoring backward-propagating radiation. This fiber-optic cable is useful for fiber-delivery of a laser beam in industrial laser processing applications, such as laser machining and laser welding, where the monitoring functionality may be used to monitor radiation propagating backwards from the target area of a workpiece. The present fiber-optic cable is configured to selectively monitor backward-propagating radiation that is coupled into a cladding of the optical fiber. This selective monitoring of cladding-coupled backward-propagating radiation helps ensure that the monitored radiation originated from the target location of the workpiece.

In the present fiber-optic cable, backward-propagating cladding-coupled radiation is at least partly stripped out of the cladding by a mode-stripper and then directed toward one or more sensors. The segment of the optical fiber equipped with the mode-stripper is situated inside a waveguide. At least a portion of the stripped radiation propagates through the waveguide in the backward direction and is collected for detection at the rear end of the waveguide. Sensors may be disposed at the rear end of the waveguide for direct detection of the backward-propagating radiation. Alternatively, or additionally, backward-propagating radiation emerging from the rear end of the waveguide may be directed to the sensor(s) by one or more reflectors. The mode-stripper, waveguide, sensor(s), and also any included reflector(s), may be implemented directly in a connector of the fiber-optic cable. All elements required to direct the stripped radiation from the waveguide to the sensor(s) can be aligned during assembly of the fiber connector, with no need for further alignment during installation in a laser processing apparatus and subsequent use in a laser processing task. Without compromising this alignment-free property of the present design, any one of the sensor(s) may be replaced by a fiber port such that a dedicated optical fiber can transmit a portion of the stripped backward-propagating radiation to an external sensor instead of an integrated sensor.

In one aspect of the invention, a fiber-optic cable with monitoring of backward-propagating radiation includes an optical fiber for transporting a forward-propagating laser beam. The optical fiber includes a core, a cladding, and an output end-face configured to emit the forward-propagating laser beam. The fiber-optic cable also includes a mode-stripper, in or on the cladding along a first longitudinal segment of the optical fiber, for coupling out of the cladding backward-propagating radiation that has been coupled into the cladding at the output end-face. Furthermore, the fiber-optic cable includes a hollow waveguide including a waveguide body with a bore containing at least a portion of the first longitudinal segment of the optical fiber. The bore has a rear opening farthest from the output end-face. The bore is defined by an inward-facing surface for guiding at least a fraction of the backward-propagating radiation, coupled out of the cladding by the mode-stripper, in a backward direction toward the rear opening. Additionally, the fiber-optic cable includes one or more optical receivers for receiving respective portions of the backward-propagating radiation emerging from the rear opening. Each optical receiver includes a sensor or an optical-fiber port.

In another aspect of the invention, a fiber-optic cable with monitoring of backward-propagating radiation includes an optical fiber for transporting a forward-propagating laser beam. The optical fiber includes a core, a cladding, and an output end-face configured to emit the forward-propagating laser beam. The fiber-optic cable also includes a mode-stripper, in or on the cladding along a longitudinal segment of the optical fiber, for coupling out of the cladding backward-propagating radiation that has been coupled into the cladding at the output end-face. Furthermore, the fiber-optic cable includes a waveguide containing at least a portion of the longitudinal segment of the optical fiber. The waveguide is configured to guide at least a fraction of the backward-propagating radiation, coupled out of the cladding by the mode-stripper, fiber in a backward direction away from the output end-face. The waveguide has a rear end farthest from the output end-face. Additionally, the fiber-optic cable includes one or more optical receivers for receiving respective portions of the backward-propagating radiation emerging from the rear end of the waveguide. Each optical receiver includes a sensor or an optical-fiber port.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figures 1A, 1B:
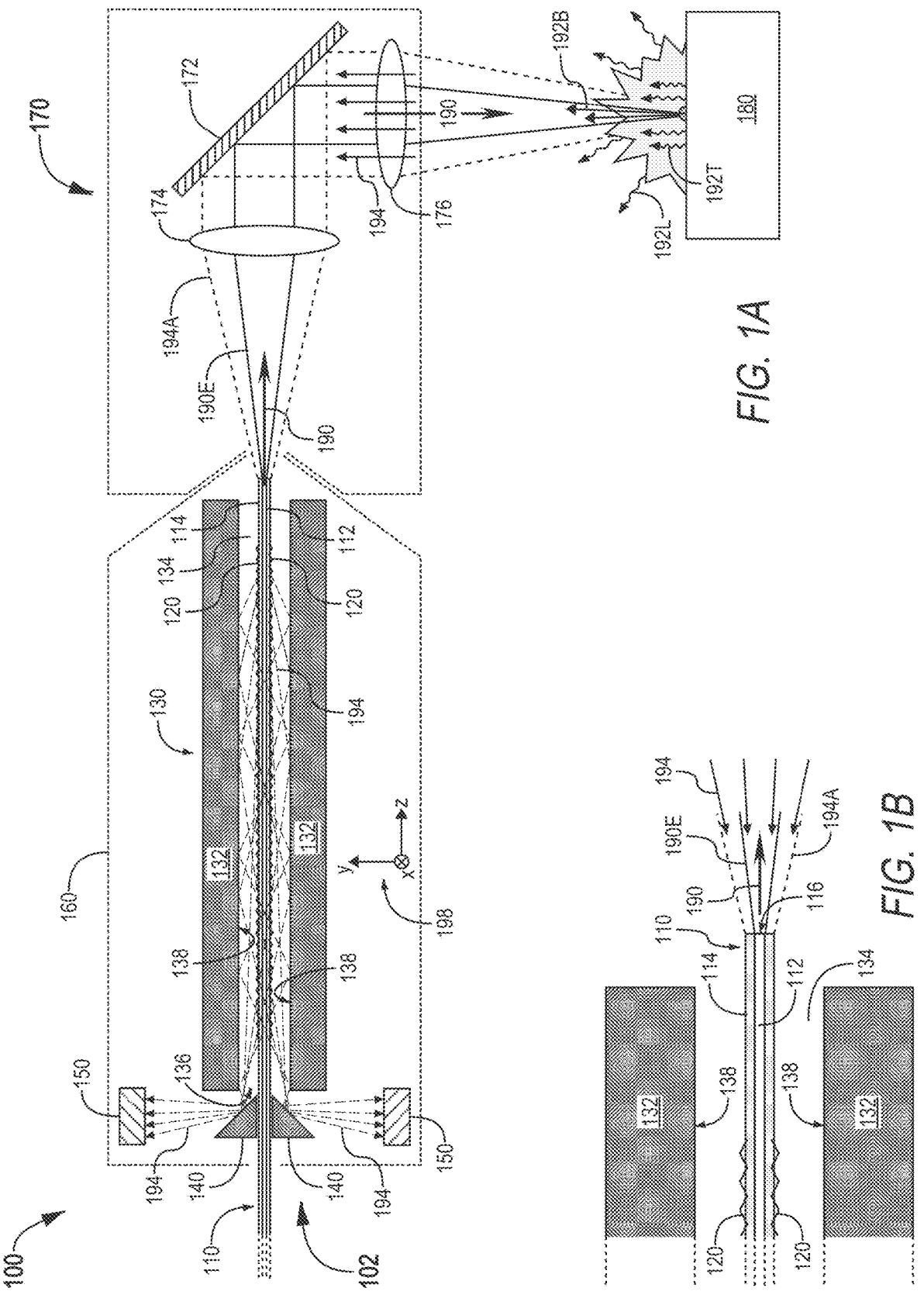
FIGS. 1A and 1B illustrate a fiber-optic cable with functionality for monitoring backward-propagating radiation, according to an embodiment. Backward-propagating radiation is stripped from a cladding of an optical fiber of the cable inside a hollow waveguide. One or more reflectors direct stripped backward-propagating radiation, emerging from a rear end of the hollow waveguide, toward one or more sensors.

Referring now to the drawings, wherein like components are designated by like numerals, FIGS. 1A and 1B illustrate, in cross-sectional views, one fiber-optic cable 100 with functionality for monitoring backward-propagating radiation. FIG. 1A shows fiber-optic cable 100 in an exemplary scenario where fiber-optic cable 100 is implemented in a laser processing apparatus together with a processing head 170 to perform a laser process on a workpiece 180. Only a portion of fiber-optic cable 100 near its output end is depicted in FIG. 1A. FIG. 1A is not to scale. For example, the depicted portion of fiber-optic cable 100 is greatly enlarged relative to processing head 170. Fiber-optic cable 100 includes an optical fiber 110, a mode-stripper 120, a hollow waveguide 130, one or more reflectors 140 (at least two in the depicted example), and one or more sensors 150 (at least two in the depicted example). Mode-stripper 120, hollow waveguide 130, reflector(s) 140, and sensor(s) 150 are implemented in an output connector 102 of fiber-optic cable 100. FIG. 1B is a magnified view of the very end of output connector 102, more clearly showing features of optical fiber 110 as well as light-coupling into and out of the end of optical fiber 110. In each of FIGS. 1A and 1B, the depicted cross section is parallel to the yz-plane of a cartesian coordinate system 198, indicated in FIG. 1A.

Optical fiber 110 has a core 112 and a surrounding cladding 114. Cladding 114 may have two or more distinct concentric cladding layers. Core 112 may include several cores, e.g., two concentric cores. Optical fiber 110 may also include additional cladding layers more radially-inwards than cladding 114, for example between a center core and an annular core of core 112.

In operation, optical fiber 110 transmits a forward-propagating laser beam 190. Forward-propagating laser beam 190 propagates predominantly in the core of optical fiber 110 and emerges from an output end-face 116 of optical fiber 110. A $1/e^2$ envelope 190E of forward-propagating laser beam 190 is indicated schematically with solid lines. Output end-face 116 of optical fiber 110 receives backward-propagating radiation 194. Backward-propagating radiation 194 may be coupled into both the core and cladding of optical fiber 110. FIGS. 1A and 1B also show an acceptance envelope 194A of cladding 114, indicated with dashed lines. Backward-propagating radiation 194 propagating toward optical fiber 110 within acceptance envelope 194A may be coupled into the cladding thereof.

In the use scenario shown in FIG. 1A, processing head 170 includes a beam-steering optic 172 (an adjustable mirror) and an objective formed by two lenses 174 and 176. Processing head 170 steers and focuses forward-propagating laser beam 190 onto a target location on workpiece 180. This scenario is readily generalized to other processing heads that include (a) an objective that focuses a forward-propagating laser beam on a workpiece and, optionally, (b) one or more beam-steering elements to direct the focused, forward-propagating laser beam to desired target locations on the workpiece. In such scenarios, the backward-propagating radiation 194 that is coupled into optical fiber 110 originates from a location on workpiece 180 that coincides, at least approximately, with the target location for forward-propagating laser beam 190.

Backward-propagating radiation 194 may include back-reflected laser radiation 192B, luminous radiation 192L, and thermal radiation 192T. The intensity and spectral distribution of backward-propagating radiation 194 may provide useful information about the laser processing of workpiece 180 performed with forward-propagating laser beam 190. The tight spatial selectivity imposed by optical fiber 110, in the coupling of backward-propagating radiation 194 into the core or cladding thereof, minimizes "contamination" of backward-propagating radiation 194 with radiation originating from areas other than the target location on workpiece 180, and thereby maximizes the integrity of the information conveyed by backward-propagating radiation 194. Fiber-optic cable 100 extracts at least a portion of the backward-propagating radiation 194 coupled into the cladding of optical fiber 110, and directs at least some of this portion of backward-propagating radiation 194 to sensor(s) 150. Measurements made by sensor(s) 150 may then be used to evaluate the laser process performed by forward-propagating laser beam 190, and make changes to the laser process based upon this evaluation. Potential changes include changes to (a) the operation of the laser source generating forward-propagating laser beam 190, (b) the operation of processing head 170, and (c) changes to local environment at workpiece 180. In one scenario, measurements obtained by sensor(s) 150 during processing of a particular workpiece 180 are used to change the state of, e.g., the laser source and/or processing head 170, during processing of that same workpiece 180. In another scenario, ongoing measurements obtained by sensor(s) 150 during processing of a series of workpieces 180 are used to detect drift in one or more process parameters and make corrections accordingly.

The extraction of cladding-coupled, backward-propagating radiation 194 from optical fiber 110 is performed by mode-stripper 120. Mode-stripper 120 is implemented in or on cladding 114. Mode-stripper 120 is schematically indicated in FIGS. 1A and 1B as a sawtooth line. In one implementation, mode-stripper 120 is a roughened section of cladding 114. Such roughening may be produced by chemical etching. In another implementation, mode-stripper 120 is non-random structure in the surface of cladding 114, for example produced by laser machining. Whereas a roughening tends to result in omnidirectional light scattering, a non-random structure may be directional and be configured to preferentially direct the stripped backward-propagating radiation 194 in the backwards direction. Mode-stripper 120 may also be in the form of an additional material, disposed on cladding 114, having a refractive index and/or surface properties that promote coupling of radiation out from the cladding.

Waveguide 130 includes a waveguide body 132 with a bore 134 that contains the longitudinal segment of optical fiber 110 having mode-stripper 120. Herein, "longitudinal" refers to the dimension along optical fiber 110, and "transverse" and "radial" refer to dimensions orthogonal to the longitudinal axis of optical fiber 110. Bore 134 is defined by an inward-facing surface 138 that is at least partially reflective. Waveguide 130 thereby restricts the net-propagation of stripped backward-propagating radiation 194 to be essentially along optical fiber 110. Some of the stripped backward-propagating radiation 194 propagates in the backwards direction, toward a rear opening 136 of bore 134 farthest from output end-face 116 of optical fiber 110, and reaches rear opening 136 after a varying number of reflections by inward-facing surface 138. Backward-propagating radiation 194 stripped out of optical fiber 110 at a shallow angle, nearly parallel to optical fiber 110, may reach rear opening 136 without being reflected by inward-facing surface 138. Exemplary propagation paths of stripped backward-propagating radiation 194 toward rear opening 136, and onwards toward sensor(s) 150, are indicated in FIG. 1A by dashed lines.

Reflector(s) 140 are disposed adjacent rear opening 136 and adjacent optical fiber 110. At least some of the stripped backward-propagating radiation 194 is incident on reflector(s) 140. Each reflector 140 is arranged to reflect stripped backward-propagating radiation 194 away from optical fiber 110 toward one or more sensors 150 positioned further from optical fiber 110. In one embodiment, each reflector 140 has a reflective surface that is oriented at about 45 degrees to the longitudinal axis of optical fiber 110, for example at between 35 and 55 degrees to the longitudinal axis of optical fiber 110. The reflective surface of reflector 140 may be planar or curved. The focusing power of a curved reflector surface may help direct stripped backward-propagating radiation 194 onto sensor(s) 150. However, a planar reflector surface is simpler to manufacture.

In embodiments of fiber-optic cable 100 including a plurality of reflectors 140, some or all of these reflectors 140 may be different respective reflective surfaces of a single part. For example, two faces may be cut/polished on the end of a glass cylinder, at 45 degrees to the cylinder axis, and then coated to form two reflectors 140.

Output connector 102 may include a connector housing 160 that contains and structurally supports waveguide 130, reflector(s) 140, and sensor(s) 150, and a portion of optical fiber 110. Connector housing 160 may be mated to a fiber port of processing head 170. Advantageously, waveguide 130, reflector(s) 140, and sensor(s) 150 may be aligned and secured during assembly of the output connector 102, such that subsequent use of fiber-optic cable 100 is alignment-free. Furthermore, connector housing 160 may be sealed such that propagation of stripped backward-propagating radiation 194 inside connector housing 160, from mode-stripper 120 to sensor(s) 150, takes place in a protected environment.

Figure 2:
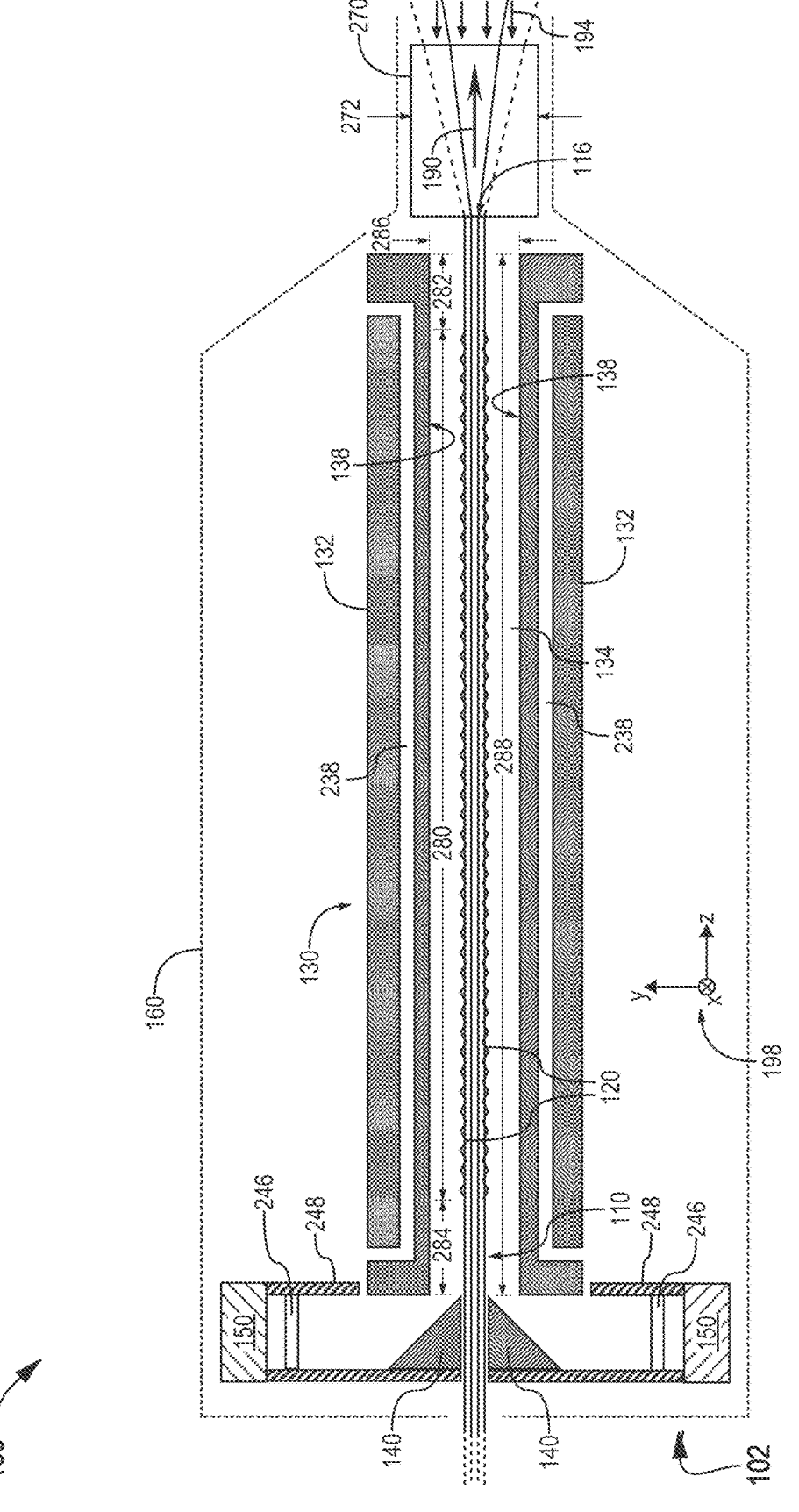
FIG. 2 illustrates the fiber-optic cable of FIG. 1 in further detail, including several optional features.

FIG. 2 illustrates fiber-optic cable 100 in further detail, including several optional features. The length-axis of bore 134 may be parallel to optical fiber 110 and may coincide with the longitudinal axis of optical fiber 110, as shown in FIG. 2. Inward-facing reflective surface 138 may be parallel to optical fiber 110, as also shown in FIG. 2. In one such example, bore 134 is cylindrical. Bore 134 of waveguide 130 has a length 288, along the longitudinal axis of optical fiber 110, and a transverse extent 286. Transverse extent 286 may be less than 10 millimeters (mm), for example in the range between 3 and 10 mm, and length 288 may be in the range between 20 and 100 mm. In one embodiment, length 288 is at least five times the maximum value of transverse extent 286. For example, when bore 134 is cylindrical, the length of the cylindrical bore may be at least five times its diameter. Mode-stripper 120 extends a distance 280 along optical fiber 110. In one example, distance 280 is between 10 and 50 mm.

In some use scenarios, the average power of forward-propagating laser beam 190 is so high that cooling is needed to manage the heat load from, e.g., partial reflections and inadvertent light leakage from optical fiber 110, as well as from components of forward-propagating laser beam 190 propagating in cladding 114 and stripped by mode-stripper 120. The average power of forward-propagating laser beam 190 may be between a few hundreds of watts and several tens of kilowatts. Waveguide body 132 may serve as a heat sink for such heat loads and may for this purpose, include one or more liquid-cooling channels 238. Although not shown in FIG. 2, liquid-cooling channel(s) 238 are contained and cooling liquid does not enter the propagation path of stripped backward-propagating radiation 194 to sensor(s) 150. Waveguide body 132 may be made substantially of metal to achieve high thermal conductivity. When the average power of forward-propagating laser beam 190 is high, backward-propagating radiation 194 may be coupled into optical fiber 110 with relatively high average power as well. Typically, back-reflected laser radiation 192B constitutes the majority of the power of backward-propagating radiation 194, in part due to reflective properties of workpiece 180 but also due to the optical components of processing head 170 usually being selected for optimal transmission at the wavelength of forward-propagating laser beam 190. In high-average-power scenarios, partial absorption of stripped backward-propagating radiation 194 by waveguide body 132 may contribute non-negligibly to heat load. In order to effectively manage the heat load from either one of (a) stripped backward-propagating radiation 194 and (b) stripped components of forward-propagating laser beam 190 propagating in cladding 114, mode-stripper 120 may terminate at non-zero distances 282 and 284 away from front and rear openings, respectively, of bore 134. Each of non-zero distances 282 and 284 may be at least 5 mm.

In a modification of output connector 102, mode-stripper 120 extends outside bore 134 in either or both of the forward direction (positive z-direction) and backward direction (negative z-direction). Extension of mode-stripper 120 in the backward direction may not be of much consequence for out-coupling of radiation from cladding 114. The majority of cladding-coupled backward-propagating radiation 192 may be stripped near the frontmost end of mode-stripper 120, and cladding-coupled portions of forward-propagation laser beam 190 may be stripped before reaching the portion of optical fiber 110 that is inside output connector 102. Extension of mode-stripper 120 in the forward direction may have a more significant influence on the behavior of output connector 102 since, as mentioned above, the majority of cladding-coupled backward-propagating radiation 192 may be stripped near the frontmost end of mode-stripper 120. However, when backward-propagating radiation 192 is partly stripped from cladding 114 by a portion of mode-stripper 120 more forward than bore 134, at least some of such stripped backward-propagating radiation 192 may propagate at angles that are sufficiently shallow to enter bore 134 and, ultimately, reach sensor(s) 150.

Although not shown in FIG. 2, fiber-optic cable 100 may include a second mode-stripper further from output end-face 116 than mode-stripper 120, for the purpose of stripping components of forward-propagating laser beam 190 propagating in cladding 114. The second mode-stripper may be implemented outside output connector 102, for example in an input connector at the input end of fiber-optic cable 100, or between output connector 102 and an end of optical fiber 110 spliced to a laser source that generates forward-propagating laser beam 190.

Certain embodiments of output connector 102 include an endcap 270 at output end-face 116 of optical fiber 110. Endcap 270 helps prevent damage to output end-face 116 that may otherwise occur if contaminants are present on output end-face 116. Endcap 270 may be fused directly to output end-face 116. Alternatively, for example if optical fiber 110 is a hollow-core fiber that cannot be fused directly to endcap 270, endcap 270 may be a short distance away from output end-face 116, with the local environment between output end-face 116 and endcap 270 being sealed. In either case, endcap 270 may include an anti-reflective coating to reduce Fresnel losses in the transmission of forward-propagating laser beam 190. The minimum value of the transverse extent 272 of endcap 270, e.g., a diameter of a cylindrical endcap 270, may exceed the maximum value of transverse extent 286 of bore 134. Connector housing 160 may be sealed to endcap 270.

As already mentioned, backward-propagating radiation 194 may include a wide range of spectral components. In order to obtain different types of information from backward-propagating radiation 194, output connector 102 may include several sensors 150, each configured to detect different spectral components of backward-propagating radiation 194. In one embodiment, output connector 102 includes one sensor 150 that detects radiation of the same wavelength as forward-propagating laser beam 190 and at least one other sensor 150 that detects radiation that does not have the same wavelength as forward-propagating laser beam 190. For example, in one embodiment configured for forward-propagating laser beam 190 of a near-infrared wavelength $\lambda_0$, output connector 102 includes a first sensor 150 that detects back-reflected laser radiation 192B at this near-infrared wavelength $\lambda_0$, a second sensor 150 that detects luminous radiation 192L within one or more portions of the visible and/or ultraviolet spectrum, and a third sensor 150 that detects infrared, (e.g., near-infrared) thermal radiation 192T away from wavelength $\lambda_0$. Regardless of how many sensors 150 are included and which wavelengths are detected by each sensor 150, output connector 102 may include one or more optical filters to improve the selectivity of detection. Spectral filter(s) 246 may be disposed between reflector(s) 140 and sensor(s) 150, and reflectors 140 may be spectrally selective. Additionally, one or more apertures 248 may restrict the acceptance cone of sensor(s) 150 so as to restrict the range of propagation angles of detected backward-propagating radiation 192 through spectral filter(s) 246. Restriction of this propagation angle range may improve the performance of spectral filtering achieved with spectral filter(s) 246. The composition of backward-propagating radiation 192 may be dominated by back-reflected laser radiation 192. Output connector 102 may therefore include at least one spectral filter 246 configured to suppress detection of back-reflected laser radiation 192B by an associated sensor 150. An associated aperture 248 may help maximize the suppression of back-reflected laser radiation 192B by this spectral filter 246. Spectral filter 246 may be wedge-shaped or arranged at non-normal incidence, and aperture 248 may include a beam trap.

Figure 3:
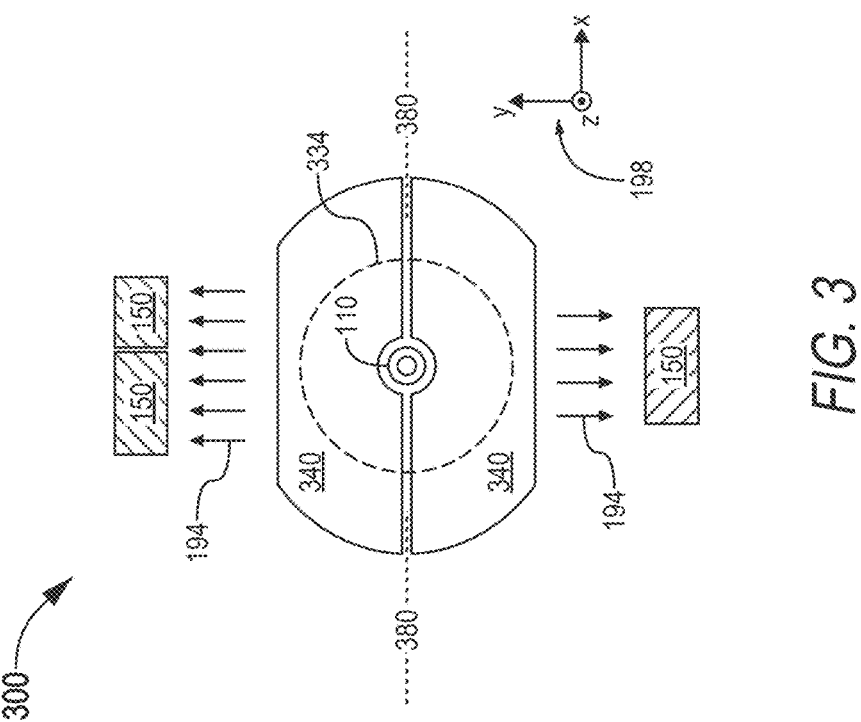
FIG. 3 shows an exemplary reflector-detector configuration of the fiber-optic cable of FIG. 1 having two reflectors.

FIG. 3 shows one exemplary reflector-detector configuration 300 of output connector 102. FIG. 3 views the reflectors and sensors along the negative z-axis direction. Configuration 300 includes two reflectors 340 disposed on opposite sides of a mid-plane 380 containing the longitudinal axis of optical fiber 110. Each reflector 340 deflects the stripped backward-propagating radiation 194, incident thereon, away from mid-plane 380, for example as depicted in FIG. 1A. Although shown in FIG. 3 as being separate from each other, reflectors 340 may be different portions of a single integrally formed structure with a ridge rather than a gap between reflectors 340. The shape of reflectors 340 may deviate from that depicted in FIG. 3.

The longitudinal projection 334 of bore 134 along the z-axis onto reflectors 340 is indicated by a dashed outline. In the example depicted in FIG. 3, longitudinal projection 334 is within the corresponding footprint of reflectors 340 in order to maximize the fraction of stripped backward-propagating radiation 194 collected by reflectors 340. Reflectors 340 have a central hole that allows optical fiber 110 to pass through reflectors 340. This central hole reduces the attainable area of reflectors 340, as does a gap or ridge between reflectors 340. Yet, it is possible to arrange reflectors 340 such that at least 75% of the projection 334 of bore 134 onto reflectors 340 coincides with attainable area thereof.

Each reflector 340 may direct stripped backward-propagating radiation 194 toward one or more sensors 150. In the example depicted in FIG. 3, one reflector 340 directs stripped backward-propagating radiation 194 toward a single sensor 150 while the other reflector 340 directs stripped backward-propagating radiation 194 toward two sensors 150. This allows for separate detection of three different spectral components of backward-propagating radiation 194 using only two reflectors.

Configuration 300 may be modified to include only a single reflector 340, e.g., configured to reflect backward-propagating radiation 192 in the positive y-axis direction. In one such embodiment, this single reflector 340 is positioned entirely on the positive y-axis side of mid-plane 380. Alternatively, the footprint of this single reflector 340 may extend across mid-plane 380 and, for example, be similar to the footprint of the pair of reflectors 340 shown in FIG. 3, without a gap or ridge at mid-plane 380.

Figure 4:
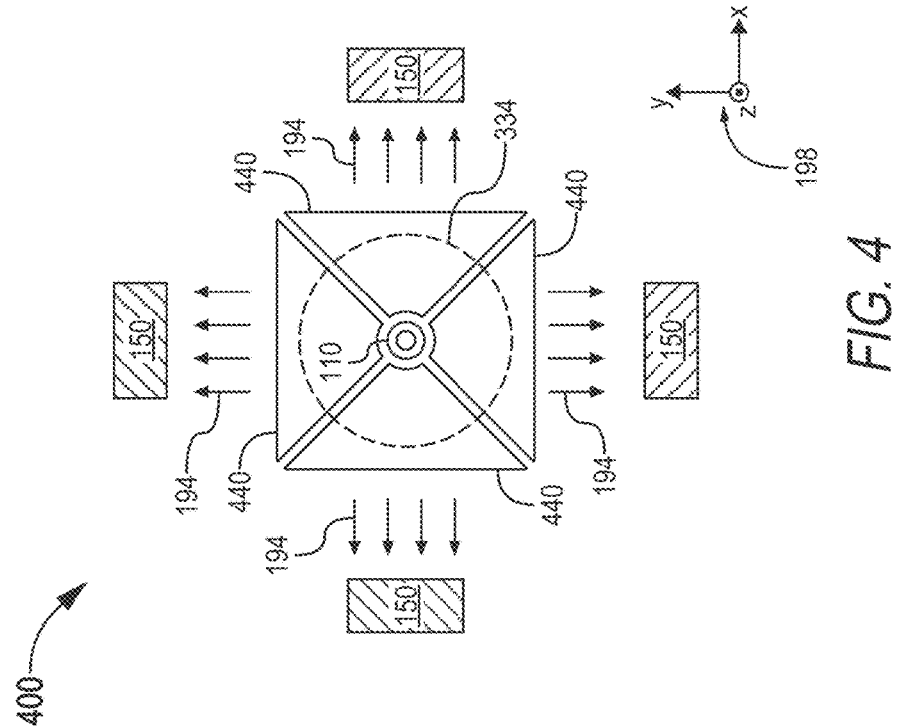
FIG. 4 shows an exemplary reflector-detector configuration of the fiber-optic cable of FIG. 1 having four reflectors.

FIG. 4 shows another exemplary reflector-detector configuration 400 of output connector 102 having four reflectors 440. FIG. 4 shows configuration 400 in a view similar to that used for configuration 300 in FIG. 3. Configuration 400 includes four reflectors 440 in a pyramid-like arrangement, each arranged to reflect stripped backward-propagating radiation 194 away from optical fiber 110. One pair of reflectors 440, disposed on opposite sides of optical fiber 110, reflect stripped backward-propagating radiation 194 generally along the x-axis, in the positive and negative direction, respectively. Another pair of reflectors 440, also disposed on opposite sides of optical fiber 110, reflect stripped backward-propagating radiation 194 generally along the y-axis, in the positive and negative direction, respectively. As for reflectors 340 in configuration 300, each reflector 440 may direct stripped backward-propagating radiation 194 toward one or more sensors 150. It may be possible to accommodate more sensors 150 with configuration 400 than with configuration 300.

Configuration 400 is readily generalized to a different number of reflectors 440 (3, 5, reflected or more) distributed about optical fiber 110 and each arranged to reflect stripped backward-propagating radiation 194 away from optical fiber 110 toward one or more sensors 150.

Figure 5:
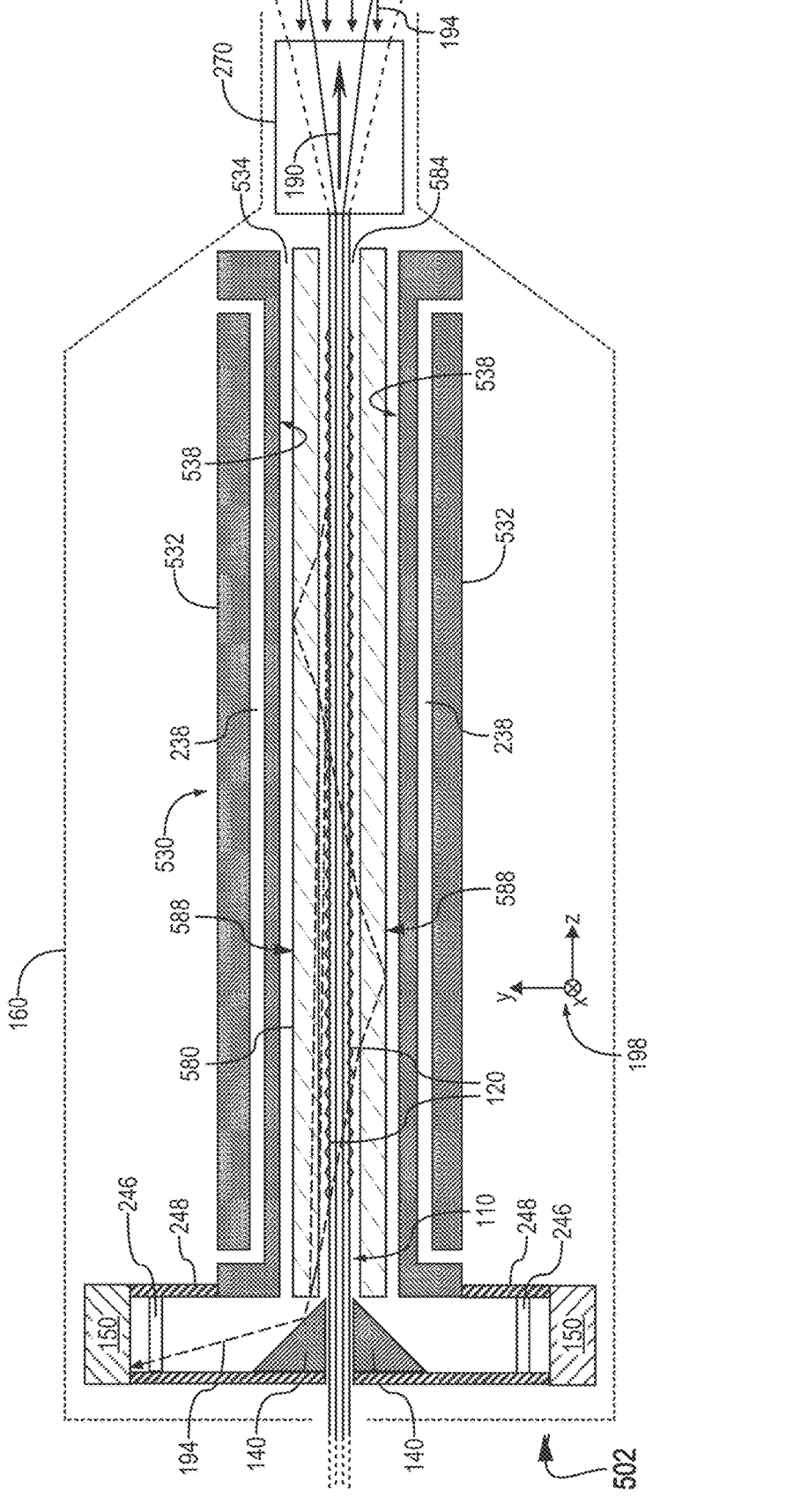
FIG. 5 illustrates another fiber-optic cable, with functionality for monitoring backward-propagating radiation, which utilizes waveguiding by a capillary tube, according to an embodiment.

FIG. 5 is a cross section of another fiber-optic cable 500 and associated output connector 502, with functionality for monitoring backward-propagating radiation, which utilizes waveguiding by a capillary tube 580. Fiber-optic cable 500 is similar to fiber-optic cable 100 except for (a) waveguide 130 of output connector 102 being replaced by a heat sink 530 in output connector 502 that is mechanically similar to waveguide 130 and (b) capillary tube 580 being disposed in the bore 534 of heat sink 530 such that the segment of optical fiber 110 having mode-stripper 120 is contained in the bore 584 of capillary tube 580. Capillary tube 580 may be a glass tube. The radially-outward-facing surface 588 of capillary tube 580 may be coated to be at least partially reflective within one or more selected wavelength ranges. Capillary tube 580 thus functions as a waveguide for spectral components of stripped backward-propagating radiation 194 within the selected wavelength range(s). Radiation that is stripped by mode-stripper 120 and has a wavelength outside the selected wavelength range(s) may pass through the coating of capillary tube 580 and reach heat sink 530. The body 532 of heat sink 530 includes one or more liquid-cooling channels 238, discussed above in reference to FIG. 2. The inward-facing surface 538 of heat sink body 532 may be predominantly absorptive. In one example, inward-facing surface 538 is coated black to maximize absorption.

Output connector 502 may be tailored for use with forward-propagating laser beam 190 of a particular wavelength $\lambda_0$. In such implementations, radially-outward-facing surface 588 of capillary tube 580 is coated to reduce and/or minimize reflection at wavelength $\lambda_0$ while promoting and/or maximizing reflection within one or more other wavelength ranges coinciding with at least some spectral components of backward-propagating radiation 194. This implementation may be advantageous when the composition of backward-propagating radiation 194 is dominated by back-reflected laser radiation 192B, which is often the case.

The coating on radially-outward-facing surface 588 of capillary tube 580 facilitates spectrally-selective waveguiding of stripped backward-propagating radiation 194, and may thereby improve the signal-to-noise ratio for detection of luminous radiation 192L and thermal radiation 192T. The coating on radially-outward-facing surface 588 may be somewhat reflective at wavelength $\lambda_0$, such that it is possible to detect back-reflected laser radiation 192B with a dedicated sensor 150. In relation to detection of back-reflected laser radiation 192B, it is also possible that some back-reflected laser radiation 192B is stripped out of optical fiber 110 at relatively shallow propagation angles and propagates directly to reflector(s) 140.

Output connector 502 may or may not include endcap 270, filter(s) 246, and aperture(s) 248. As is the case for output connector 102, output connector 502 may implement a variety of reflector-detector configurations, including configurations 300 and 400.

Figure 6:
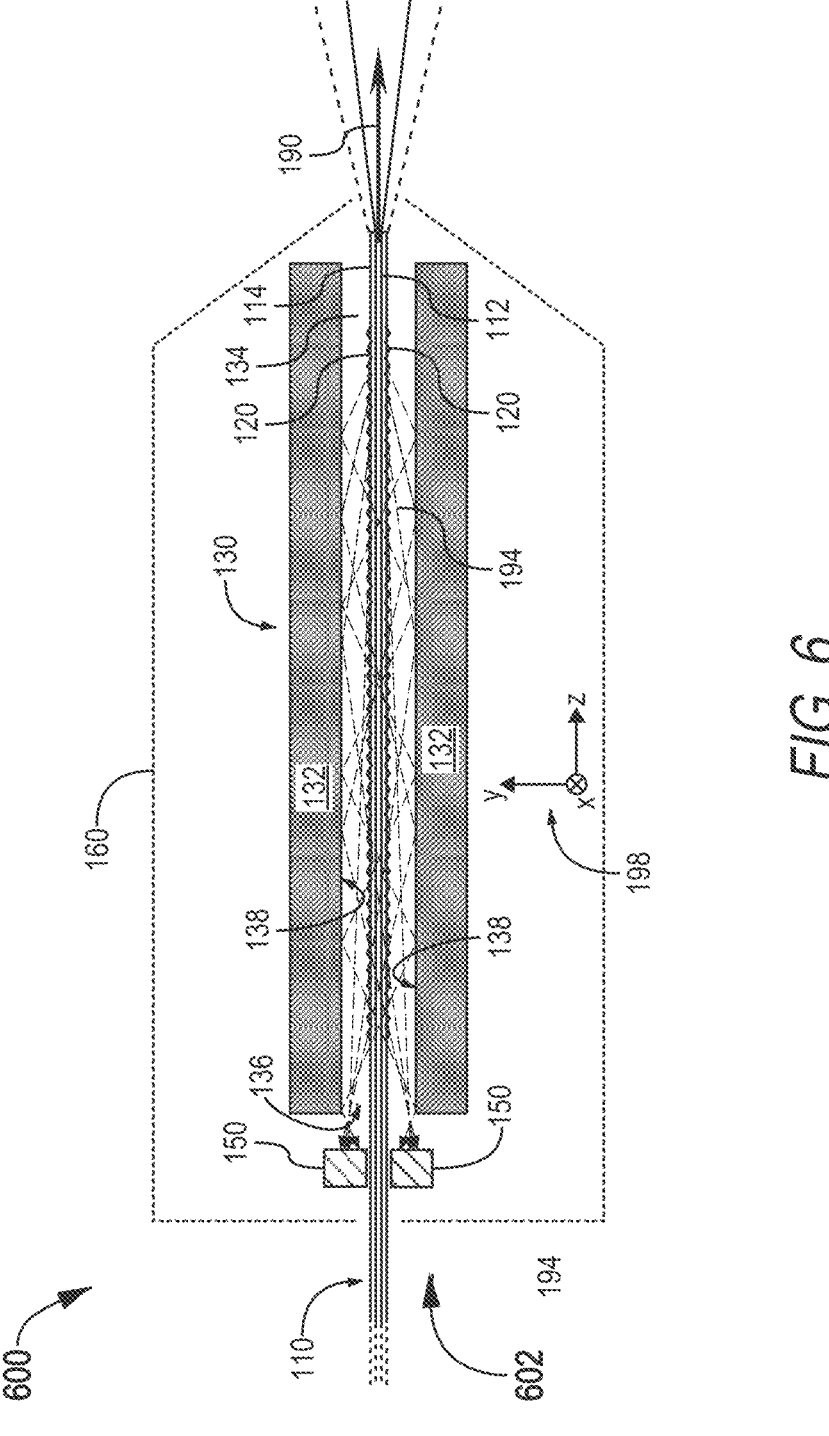
FIG. 6 illustrates a modification of the fiber-optic cable of FIG. 1 that positions one or more sensors directly at the rear opening of the hollow waveguide, according to an embodiment.

FIG. 6 illustrates yet another fiber-optic cable 600, with functionality for monitoring of backward-propagating radiation. Fiber-optic cable 600 is a modification of fiber-optic cable 100, wherein the associated output connector 602 omits reflector(s) 140 and sensor(s) 150 instead are positioned adjacent optical fiber 110 and rear opening 136 of waveguide 130. Optionally, one or more spectral filter(s) 246 are positioned in front of sensor(s) 150 at this location. Output connector 602 requires fewer optical elements than output connector 102 and may present cost savings over output connector 102. However, when the transverse extent of bore 134 is in the range of millimeters, it may be challenging fit sensor(s) 150 sufficiently close to optical fiber 110, especially in embodiments that include three of more sensors 150 and, optionally, associated optical filters.

The modification of fiber-optic cable 100 and output connector 102 to arrive at fiber-optic cable 600 and output connector 602 may also be applied to fiber-optic cable 500 and output connector 502. Additionally, each of output connectors 102, 502, and 602 may be modified for use with external sensors. In such modifications, one or more sensors 150 are replaced by respective fiber ports. A transport fiber can then be coupled to each such fiber port and transport stripped backward-propagating radiation 194 to an external sensor not integrated directly in the output connector. Thus, more generally, sensor(s) 150 of output connectors 102, 502, and 602 may be replaced by respective optical receivers. Each optical receiver is in the form of a sensor or a fiber port.

The present invention is described above in terms of a preferred embodiment and other embodiments. The invention is not limited, however, to the embodiments described and depicted herein. Rather, the invention is limited only by the claims appended hereto.

What is claimed is:

1. A fiber-optic cable with monitoring of backward-propagating radiation, comprising:

an optical fiber for transporting a forward-propagating laser beam, the optical fiber including a core, a cladding, and an output end-face configured to emit the forward-propagating laser beam;

a mode-stripper, in or on the cladding along a longitudinal segment of the optical fiber, for coupling out of the cladding backward-propagating radiation that has been coupled into the cladding at the output end-face;

a waveguide containing at least a portion of the longitudinal segment of the optical fiber and configured to guide at least a fraction of the backward-propagating radiation, coupled out of the cladding by the mode-stripper, in a backward direction away from the output end-face, the waveguide having a rear end farthest from the output end-face, the waveguide including a capillary tube containing the longitudinal segment of the optical fiber and having a radially-outward-facing surface that is less reflective at a first wavelength than within one or more wavelength ranges away from the first wavelength; and one or more optical receivers for receiving respective portions of the backward-propagating radiation emerging from the rear end of the waveguide, each optical receiver including a sensor or an optical-fiber port.

2. The fiber-optic cable of claim 1, wherein the longitudinal segment is entirely contained in the bore.

3. The fiber-optic cable of claim 1, wherein the fiber-optic cable further includes a heat sink and an inward-facing surface that (a) defines a bore containing the longitudinal segment of the optical fiber and at least an associated longitudinal segment of the capillary and (b) is predominantly absorptive.

4. The fiber-optic cable of claim 3, wherein the heat sink has a liquid cooling channel.

5. The fiber-optic cable of claim 1, further comprising an output-connector housing that contains the waveguide, the optical fiber, and the one or more optical receivers.

6. The fiber-optic cable of claim 1, wherein the bore has a longitudinal extent along the optical fiber and a largest transverse extent orthogonally to the optical fiber, the longitudinal extent being at least five times the transverse extent.

7. The fiber-optic cable of claim 1, wherein at least one of the optical receivers is disposed adjacent to the rear opening and the optical fiber.

8. The fiber-optic cable of claim 1, further comprising one or more reflectors disposed adjacent to the rear opening and the optical fiber, each reflector being arranged to reflect toward at least one of the one or more optical receivers the respective portion of the backward-propagating radiation.

9. The fiber-optic cable of claim 8, further comprising, for at least one of the one or more optical receivers, a wavelength filter positioned in a propagation path of the respective portion of the backward-propagating radiation from one of the one or more reflectors to the optical receiver.

10. The fiber-optic cable of claim 9, further comprising an aperture restricting an acceptance cone for the at least one of the one or more optical receivers.

11. The fiber-optic cable of claim 8, wherein the one or more reflectors are two reflectors disposed on opposite sides of a mid-plane containing a longitudinal axis of the optical fiber, each of the two reflectors being arranged to deflect the backward-propagating radiation, incident thereon, away from the mid-plane.

12. The fiber-optic cable of claim 8, wherein the one or more reflectors are a plurality of reflectors distributed about the optical fiber, each of the reflectors being arranged to deflect the backward-propagating radiation, incident thereon, away from the optical fiber.

13. The fiber-optic cable of claim 1, wherein the waveguide body is made of metal and contains at least one liquid-cooling channel.

14. The fiber-optic cable of claim 1, wherein the inward-facing surface is cylindrical.

15. The fiber-optic cable of claim 14, wherein the inward-facing surface has a diameter of no more than 10 millimeters.

16. The fiber-optic cable of claim 1, wherein the mode-stripper extends at least 10 millimeters along the optical fiber.

17. The fiber-optic cable of claim 1, wherein the mode-stripper is a textured surface of the cladding.

18. The fiber-optic cable of claim 1, wherein each of the one or more optical receivers is a sensor.

19. The fiber-optic cable of claim 1, wherein the one or more optical receivers include three sensors.

* * * * *